United States Patent
Lin et al.

(10) Patent No.: US 8,760,005 B2
(45) Date of Patent: Jun. 24, 2014

(54) CONTROL METHOD OF AN UNINTERRUPTIBLE POWER SUPPLY FOR EXTENDING A DISCHARGE TIME UNDER A NO-LOAD CONDITION

(75) Inventors: Yung-Mei Lin, Taipei (TW); Kuang-Ping Li, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 611 days.

(21) Appl. No.: 13/116,190

(22) Filed: May 26, 2011

(65) Prior Publication Data

US 2012/0299382 A1 Nov. 29, 2012

(51) Int. Cl.
*H02J 7/00* (2006.01)
*H02J 9/00* (2006.01)

(52) U.S. Cl.
USPC ........................................................... 307/66

(58) Field of Classification Search
USPC ..................................... 307/64, 66; 320/129
See application file for complete search history.

(56) References Cited

U.S. PATENT DOCUMENTS 7,622,929 B2 * 11/2009 Tinnemeyer et al. ......... 324/426

* cited by examiner

*Primary Examiner* — Carlos Amaya
(74) *Attorney, Agent, or Firm* — Ming Chow; Sinorica, LLC

(57) ABSTRACT

A control method of an uninterruptible power supply (UPS) for extending a discharge time under a no-load condition instructs a battery of the UPS to discharge by repeating an alternate on and off cycle when the UPS enters a battery mode and after a no-load condition continues over a period of time so that the UPS alternately and repeatedly discharges and stops discharging based on the alternate on and off cycle, and detects if the no-load condition is not present during the discharging period. If not present, the battery is restored to continuously discharge. Additionally, the discharge voltage can be reduced during the discharging period to alleviate the power discharged under the no-load condition. Accordingly, the control method can reduce to discharge under the no-load condition and further extend a discharge time under a no-load condition.

16 Claims, 6 Drawing Sheets

CONTROL METHOD OF AN UNINTERRUPTIBLE POWER SUPPLY FOR EXTENDING A DISCHARGE TIME UNDER A NO-LOAD CONDITION

BACKGROUND OF THE INVENTION

1. Field of the Invention

The present invention relates to a control method of an uninterruptible power supply (UPS), and more particularly to a control method of a UPS capable of extending a discharge time under a no-load condition.

2. Description of the Related Art

Uninterruptible power supplies (UPS) are the power backup equipment serving to supply backup power to a load when the AC mains is abnormal, such as power outage, overvoltage/undervoltage, occurrence of surge current and the like, so as to continuously supply an operating power to the load and prevent some mission-critical equipment, such as computers, telecommunication networks, private branch exchanges (PBX) and the like, from losing data or getting out of control.

Conventional UPSs can be generally classified as on-line UPSs, off-line UPSs and line-interactive UPSs.

The On-line UPSs serve to separate the AC mains and load so that the mains power is sent to the UPSs and is converted into DC power to charge a battery set instead of being directly supplied to the load. Meanwhile, the DC power is further converted into AC power, and then the AC power is supplied to the load. Once power outage or power abnormality occurs, a battery mode is enabled and AC power is converted from the DC power of the battery set and is supplied to the load. Basically, the power waveforms outputted by the on-line UPSs and by the AC mains both pertain to sinusoidal waves.

The off-line UPSs usually play a power backup role. When the AC mains is normal, the mains power is directly supplied to the load for simultaneously charging a battery set. Once the AC mains fails, a mains power supply loop of the off-line UPSs is automatically disconnected from the AC mains and a battery mode is enabled so that the AC power converted from the DC power of the battery set is further supplied to the load. As the waveform of the AC power converted from the DC power of the battery set pertains to a square wave, the converted AC power can be supplied to capacitive loads only.

The line-interactive UPSs are equipped with a voltage fluctuation circuit, are operated the same way as the off-line UPSs, and do not intervene to supply power throughout the entire course. Instead, the line-interactive UPSs monitor the condition of the mains supply on a real-time basis, and instantly perform voltage fluctuation or enter a battery mode to replace the AC mains and continuously supply power to the load when the AC mains supply is abnormal.

The above UPSs enter a battery mode and keep converting the DC power of the battery set into AC power and supplying the AC power to the load when the AC mains fails. However, even during a no-load condition or when the load turns off, upon entering the battery mode, the UPSs continuously discharge. When a power capacity of the battery set is discharged down to a low voltage level, the UPSs automatically shut off. To ensure that the UPSs can immediately supply power to the load having a power demand and that normal power supply is not affected by draining the power of the battery set when the load turns off, the discharged power of the battery set should be kept at minimum during the no-load condition. In other words, the discharge time of the battery set under the no-load condition should last as long as possible so as to be responsive to a sudden power demand.

SUMMARY OF THE INVENTION

An objective of the present invention is to provide a control method of an uninterruptible power supply capable of extending a discharge time under a no-load condition.

To achieve the foregoing objective, the control method of an uninterruptible power supply (UPS) for extending a discharging time under a no-load condition, in which the UPS is equipped with a battery and a mains power charges the battery of the UPS, has steps of:

determining if the mains power is abnormal;

entering a battery mode so that the battery continuously discharges when the mains power is abnormal;

determining if the no-load condition is present;

instructing the battery to discharge by repeating an alternate on and off cycle after the no-load condition continues over a period of time;

determining if the no-load condition is not present when the battery discharges; and entering the battery mode so that the battery continuously discharges when the no-load condition is not present.

Preferably, the alternate on and off cycle is cyclically repeated and has an on cycle and an off cycle alternately performed. During the on cycle, the battery continuously discharges, and during the off cycle, the battery stops discharging.

Preferably, a discharge voltage of the battery is reducible when the battery discharges during each alternate on and off cycle.

Preferably, a ratio of the on cycle to the off cycle is one to one.

When the AC mains is abnormal, the UPS is instructed to enter a battery mode and determine if the no-load condition is present. If positive and the no-load condition continues over a period of time, the battery is instructed to discharge by repeating an alternate on and off cycle. The alternate on and off cycle is cyclically repeated and has an on cycle and an off cycle alternately performed. If the ratio of the on cycle to the off cycle is one to one, one half of the discharged power can be saved and the discharge time under the no-load condition can be doubled. During the discharging period, a load condition is continuously monitored. When the no-load condition is not present, the battery is restored to continuously discharge to supply power so as to avoid mode switch and enhance the power utilization efficiency. Additionally, the discharge power can be reduced during the alternate on and off cycle to further extend the no-load discharge time.

Other objectives, advantages and novel features of the invention will become more apparent from the following detailed description when taken in conjunction with the accompanying drawings.

DETAILED DESCRIPTION OF THE INVENTION

Figure 1:
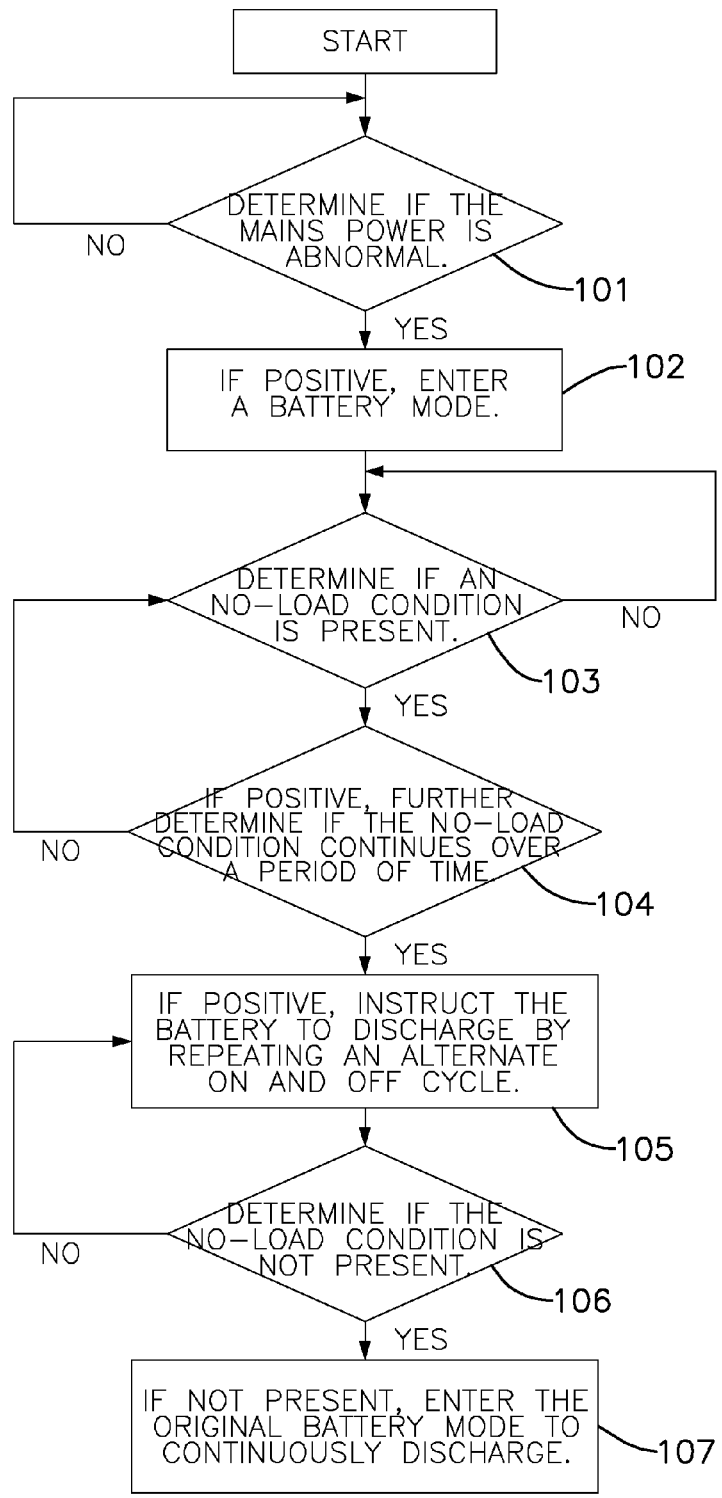
FIG. 1 is a flow diagram of a control method of UPS for extending a discharge time under a no-load condition in accordance with the present invention.

With reference to FIG. 1, a control method of UPS for extending a discharge time under a no-load condition in accordance with the present invention is applicable to a UPS equipped with a battery. A mains power charges the battery, and the method has the following steps:

STEP 101: Determine if the mains power is abnormal.

STEP 102: If positive, enter a battery mode so that the battery continuously discharges when the mains power is abnormal.

STEP 103: Determine if the no-load condition is present.

STEP 104: If positive, further determine if the no-load condition continues over a period of time.

STEP 105: If positive, instruct the battery to discharge by repeating an alternate on and off cycle.

STEP 106: Determine if the no-load condition is not present when the battery discharges.

STEP 107: If not present, enter the original battery mode to continuously discharge.

Figure 2:
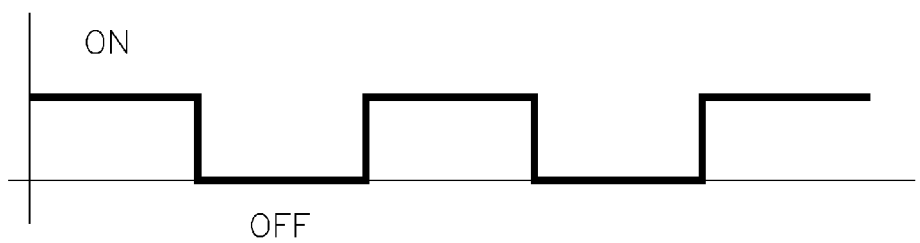
FIG. 2 is an alternate discharge waveform diagram of the control method in FIG. 1.

The operation of the control method is basically identical to that of regular UPSs. For an off-line UPS, when the AC mains is normal, the AC mains charges the battery and also directly supplies power to a load. For an on-line UPS, the mains power is first converted into DC power to charge the battery and the DC power is simultaneously converted back to AC power to supply the load. For a line-interactive UPS, the operation thereof is similar to that of the off-line UPS. Once the mains power fails, the above steps are performed. A battery mode is enabled to continuously discharge when the failure of the mains power is detected. Next step is to determine if the no-load condition is present or the load is turned off. If the no-load condition is present and the no-load condition continues over a period of time, the battery is instructed to discharge by repeating an alternate on and off cycle. With reference to FIG. 2, the alternate on and off cycle substantially includes an on cycle and an off cycle. During the on cycle, the battery continuously discharges. During the off cycle, the battery stops discharging. The ratio of the on cycle to the off cycle is preset and adjustable and the on cycle and the off cycle are repeatedly and alternately performed. For example, when the on cycle is preset as 3 seconds and the off cycle is preset as 3 seconds, the battery of the UPS continuously discharges for 3 seconds and then stops discharging for 3 seconds. As the ratio of the on cycle to the off cycle is 1:1, theoretically, half of the discharging power can be reduced and the discharge time under the no-load condition can be doubled.

The discharge time under the no-load condition can be effectively extended by repeatedly discharging with the alternate on and off cycle. Better yet, if the discharge voltage is regulated during the discharge cycle, the discharge time under a no-load condition can be further extended. For example, if the discharge voltage of a UPS under a no-load condition is 120 volts and the discharge voltage during the alternate on and off cycle is reduced to, for example, 60 volts, the discharging power under the no-load condition is reduced. Hence, the discharge time of the UPS under the no-load condition can be further prolonged. To ensure that the UPS normally performs upon discharging with the on and off cycle, the UPS also monitors a load demand from the load. When the load is turned on and the no-load condition is not present, the original battery mode that continuously supplies power is restored. As the present invention detects the load demand during the alternate on and off cycle, in consideration of reducing power consumed during mode switching, once a load demand is detected, the discharging battery keeps discharging without having to switch from an off state to a discharging state so as to enhance the power utilization efficiency.

Figure 3:
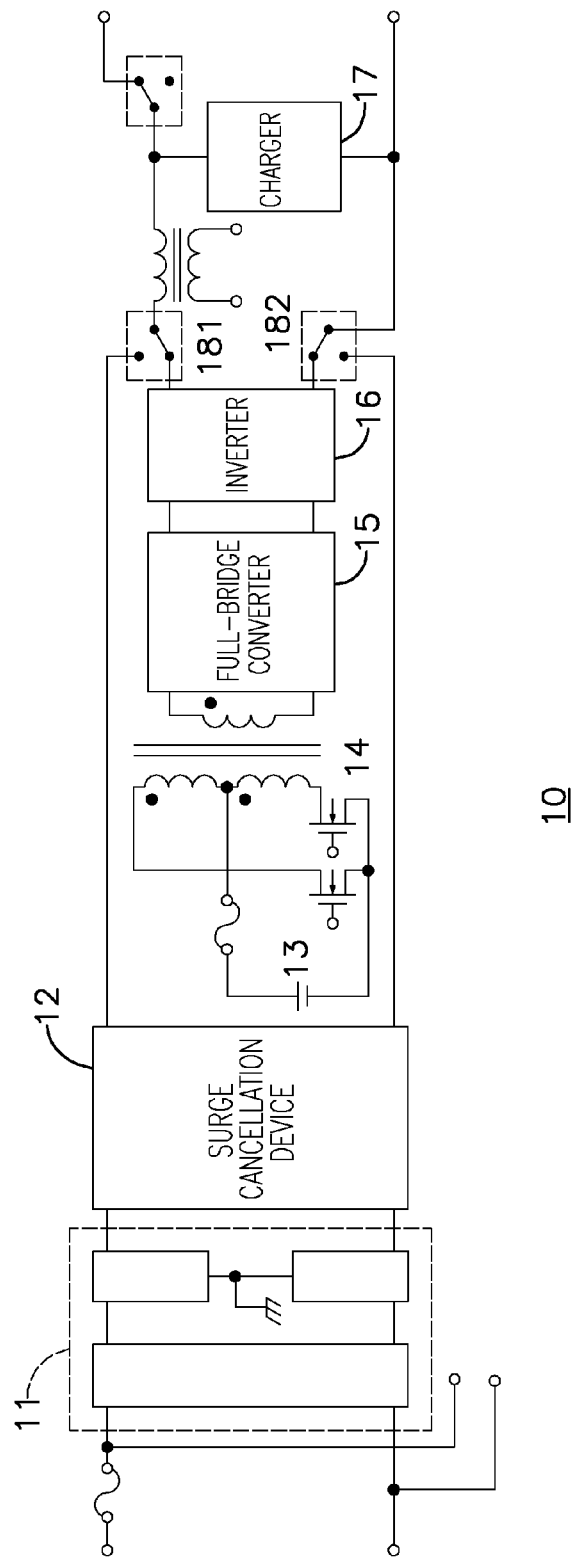
FIG. 3 is a circuit diagram of an off-line UPS applicable to the control method in FIG. 1.

The foregoing control method can be applied to the on-line, off-line and line-interactive UPSs. With reference to FIG. 3, an off-line UPS 10 in accordance with the present invention has an EMI filter circuit 11, a surge cancellation device 12, a battery set 13, a transformer 14, a full-bridge converter 15, an inverter 16 and a charger 17. An input terminal of the surge cancellation device 12 is connected to the mains power through the EMI filter circuit 11. An output terminal of the surge cancellation device 12 is connected to a power output terminal and the charger 17 through the two switches 181, 182. The battery set 13 is connected with the charger 17 and is connected with a primary side of the transformer 14. A secondary side of the transformer 14 is connected to the inverter 16 through the full-bridge converter 15. An output terminal of the inverter 16 is connected to the power output terminal through the two switches 181, 182.

When the mains power is normal, the mains power is transmitted to a load through the surge cancellation device 12, the switches 181, 182 and the power output terminal, and the charger 17 simultaneously charges the battery set 13. Once the mains power fails, the two switches 181, 182 switch change-over contacts so that the output terminal of the inverter 16 is connected to the power output terminal through the switches 181, 182, the DC power of the battery set 13 is converted into AC power by the full-bridge converter 15 and the inverter 16, and the AC power is supplied to the load. When the load is turned off and the UPS is in a no-load condition, the control method of the present invention is performed to prolong the discharge time under a no-load condition. The duty cycle of each power switch in the full-bridge converter 15 can be adjusted to further lower the discharge voltage during the discharging period.

Figure 4:
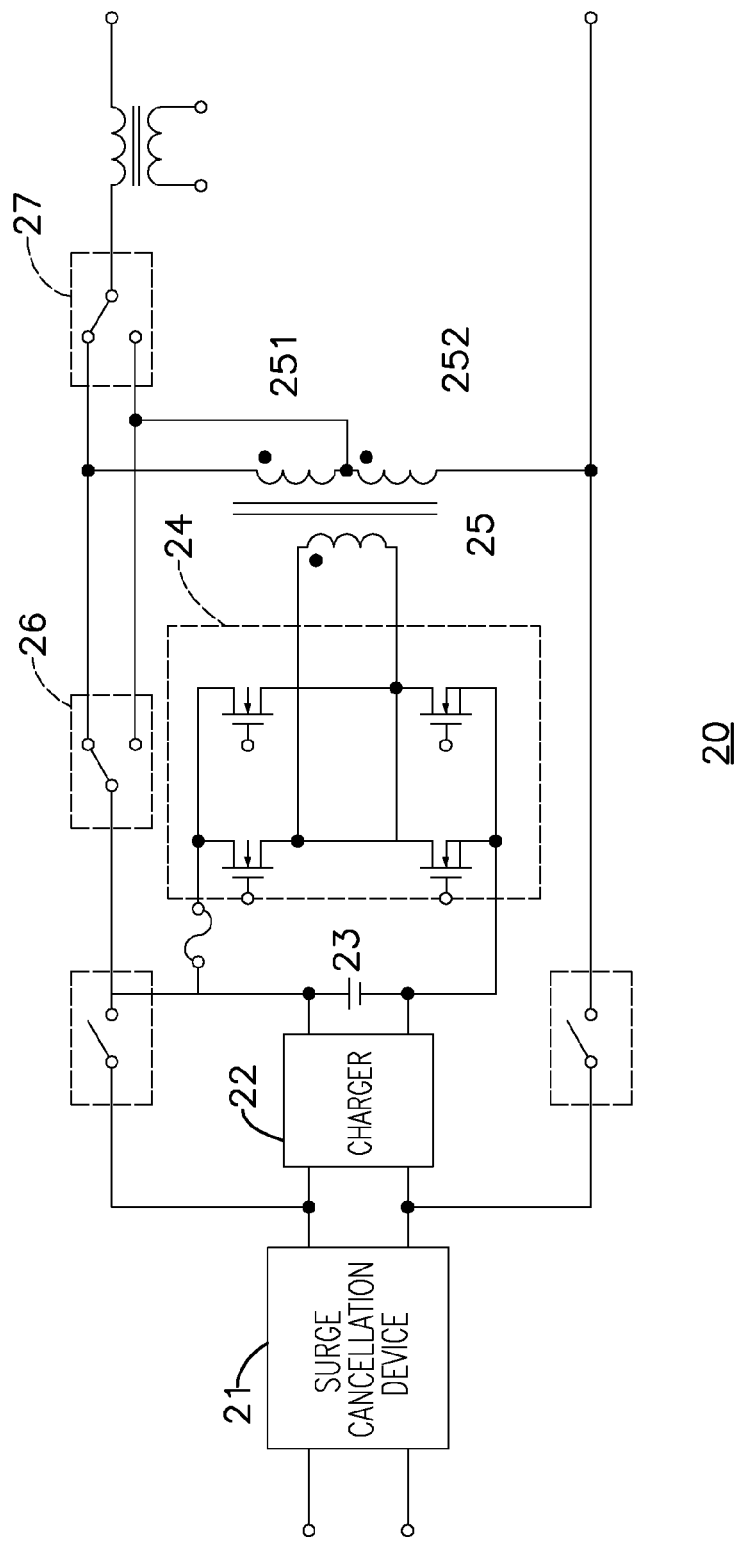
FIG. 4 is a circuit diagram of another off-line UPS applicable to the control method in FIG. 1.

With reference to FIG. 4, another off-line UPS 20 in accordance with the present invention has a surge cancellation device 21, a charger 22, a battery set 23, a full-bridge converter 24 and a transformer 25. The surge cancellation device 21 also has an EMI filtering function. An input terminal of the surge cancellation device 21 is connected with the mains power. An input terminal of the charger 22 is connected to the output terminal of the surge cancellation device 21. The battery set 23 is connected with an output terminal of the charger 22. An input terminal of the full-bridge converter 24 is connected with the output terminal of the charger 22 and the battery set 23. A primary side of the transformer 25 is connected with an output terminal of the full-bridge converter 24. A second side of the transformer 25 has a first winding 251 and a second winding 252. The first winding 251 and the second winding 252 are respectively connected with a boost switch 26 and a buck switch 27. The boost switch 26 and the buck switch 27 are connected between the input terminal of the surge cancellation device 21 and a load. By switching change-over contacts of the boost switch 26 and the buck switch 27, the transformer 25 can serve as a boost transformer or a buck transformer during a battery mode.

When the mains power is normal, the mains power charges the battery set 23 through the surge cancellation device 21 and the charger 22, and also supplies the load through the boost switch 26 and the buck switch 27. Once the mains power fails, the DC power of the battery set 23 is converted into AC power by the full-bridge converter 24 and then the AC power is supplied to the load. When the load is turned off and the UPS is in a no-load condition, the control method of the present invention is performed to prolong the discharge time under a no-load condition.

Figure 5:
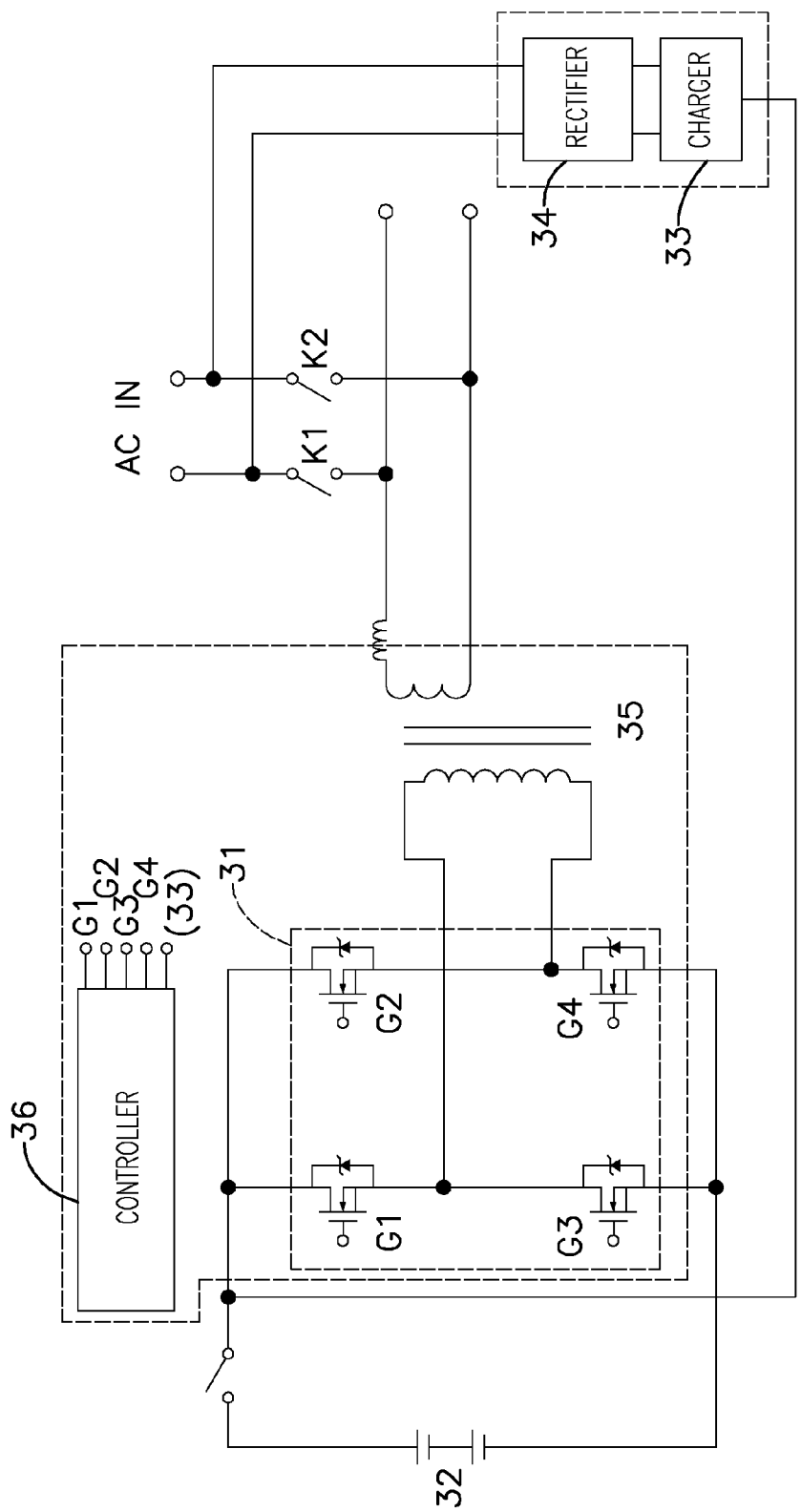
FIG. 5 is a circuit diagram of a line-interactive UPS applicable to the control method in FIG. 1.

With reference to FIG. 5, a line-interactive UPS 30 has a full-bridge converter 31, a battery set 32, a charger 33, a transformer 35 and a controller 36. The full-bridge converter 31 has four sets of power switches G1 to G4. The battery set is connected with an input terminal of the full-bridge converter 31. An input terminal of the charger 33 is connected to the mains power (AC IN) through a rectifier 34. An output terminal of the charger 33 is connected with the battery set 32. A primary side of the transformer 35 is connected with an output terminal of the full-bridge converter 31. A secondary side of the transformer 35 is connected with a power output terminal. The power output terminal is connected to the mains power through two switches k1, k2. The controller 36 is connected with the power switches G1 to G4 of the full-bridge converter 31 and the charger 33 to turn on or off each power switch G1 to G4 of the full-bridge converter 31 and control the charger 33 to charge the battery set 32 or not.

When the mains power is normal, the switches k1, k2 are closed, and the mains power directly supplies a load through the power output terminal and simultaneously charges the battery set 32 through the charger 33. Meanwhile, the full-bridge converter 31 and the transformer 35 are not operated, and the controller 36 monitors a power supply condition. When the mains power fails, the charger 33 stops charging the battery set 32. Instead, the DC power of the battery set 32 is converted into AC power by the full-bridge converter 31, and then the AC power is supplied to the load. When the load is turned off and the UPS is in a no-load condition, the control method of the present invention is performed to prolong the discharge time under a no-load condition.

Figure 6:
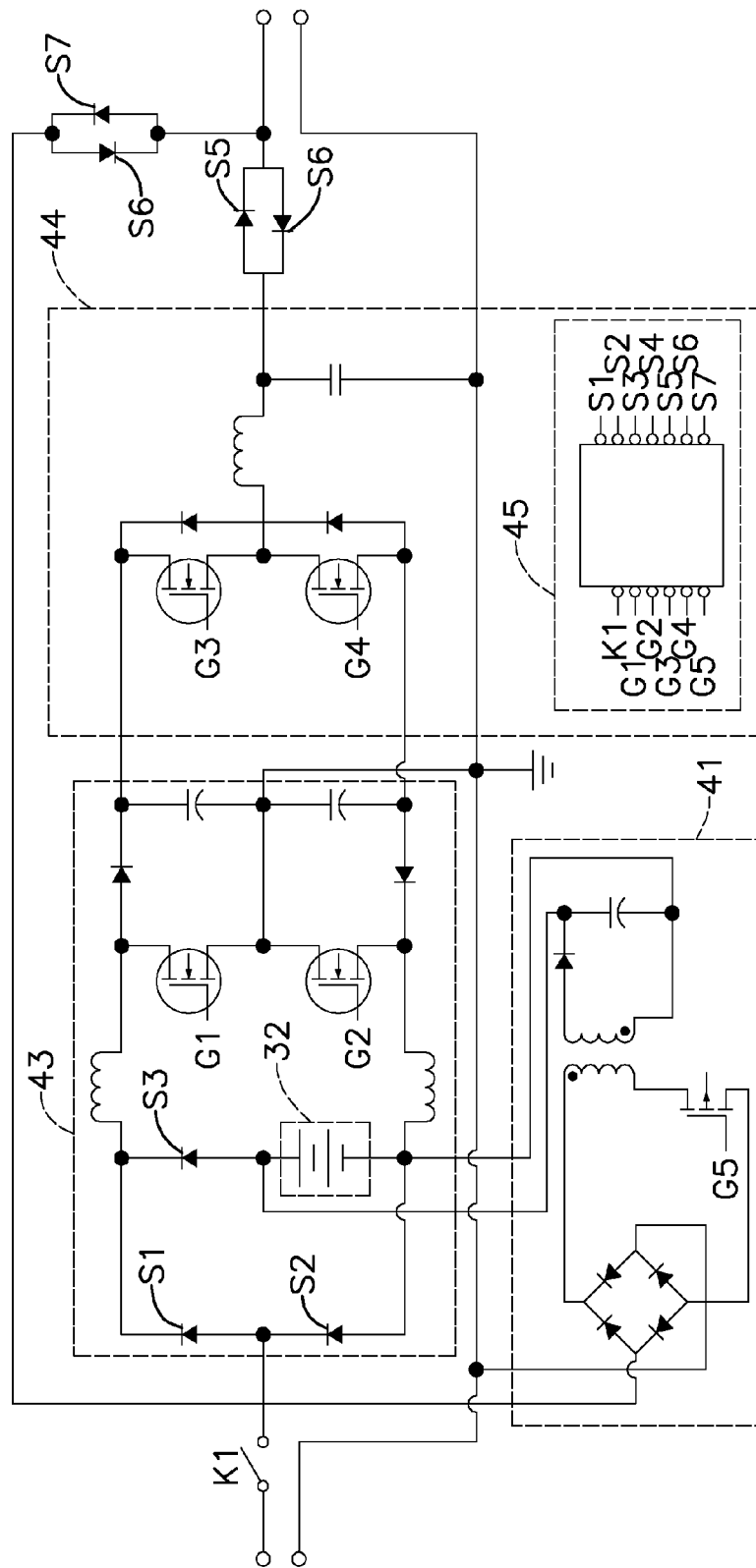
FIG. 6 is a circuit diagram of an on-line UPS applicable to the control method in FIG. 1.

With reference to FIG. 6, an on-line UPS 40 has a charger 41, a battery set 42, a rectifier 43, a half-bridge inverter 44 and a controller 45. An input terminal of the charger 41 is connected to the mains power. The battery set 42 is connected with an output terminal of the charger 41. An input terminal of the rectifier 43 connected between two serially connected diodes S1, S2 is connected to the mains power. The battery set 42 is connected with another diode S3 of the rectifier 43 parallelly connected with the two serially connected diodes S1, S2. The rectifier 43 further has two power switches G1 and G2 collaborated with the three diodes S1, S2, S3 to perform AC to DC power rectification during a line mode and DC to DC power conversion during a battery mode. An input terminal of the half-bridge inverter 44 is connected with an output terminal of the rectifier 43, and an output terminal of the half-bridge inverter 44 is connected to a load. The half-bridge inverter 44 has two sets of power switches G3 and G4 and performs DC to AC power conversion. The controller 45 is connected with the power switches G1, G2, of the rectifier 43, G3, G4 of the half-bridge inverter 44 and G5 of the charger 41 to turn on or off each power switch G1, G2 of the rectifier 43 and G3, G4 of the half-bridge converter 44 and control the charger 41 to charge the battery set 42 or not.

When the mains power is normal, the switch K1 is closed, and the rectifier 43 rectifies the mains power to a DC power and the half-bridge inverter 44 converts the DC power into an AC power and supplies the AC power to a load. Meanwhile, the mains power charges the battery set 42 through the charger 43. and the controller 45 monitors a power supply condition. When the mains power fails, the charger 41 stops charging the battery set 42. A DC power supplied by the battery set 42 is boosted by the rectifier 43, and the boosted DC power is converted into an AC power by the half-bridge inverter and is supplied to the load. When the load is turned off and the UPS is in a no-load condition, the control method of the present invention is performed to prolong the discharge time under a no-load condition.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A control method of an uninterruptible power supply (UPS) for extending a discharging time under a no-load condition, wherein the UPS is equipped with a battery and a mains power charges the battery of the UPS, the control method comprising steps of:
   determining if the mains power is abnormal;
   entering a battery mode so that the battery continuously discharges when the mains power is abnormal;
   determining if the no-load condition is present;
   instructing the battery to discharge by repeating an alternate on and off cycle after the no-load condition continues over a period of time;
   determining if the no-load condition is not present when the battery discharges; and
   entering the battery mode so that the battery continuously discharges when the no-load condition is not present.

2. The control method as claimed in claim 1, wherein the alternate on and off cycle is cyclically repeated and has an on cycle and an off cycle alternately performed, during the on cycle, the battery continuously discharges, and during the off cycle, the battery stops discharging.

3. The control method as claimed in claim 2, wherein an output voltage of the UPS is reducible when the battery discharges during each alternate on and off cycle.

4. The control method as claimed in claim 3, wherein a ratio of the on cycle to the off cycle is adjustable.

5. The control method as claimed in claim 1, wherein the UPS is an off-line UPS.

6. The control method as claimed in claim 2, wherein the UPS is an off-line UPS.

7. The control method as claimed in claim 3, wherein the UPS is an off-line UPS.

8. The control method as claimed in claim 4, wherein the UPS is an off-line UPS.

9. The control method as claimed in claim 1, wherein the UPS is a line-interactive UPS.

10. The control method as claimed in claim 2, wherein the UPS is a line-interactive UPS.

11. The control method as claimed in claim 3, wherein the UPS is a line-interactive UPS.

12. The control method as claimed in claim 4, wherein the UPS is a line-interactive UPS.

13. The control method as claimed in claim 1, wherein the UPS is an on-line UPS.

14. The control method as claimed in claim 2, wherein the UPS is an on-line UPS.

15. The control method as claimed in claim 3, wherein the UPS is an on-line UPS.

16. The control method as claimed in claim 4, wherein the UPS is an on-line UPS.

* * * * *